May 27, 1924.
C. H. BRADEN
TIRE CASING
Filed Feb. 14, 1922
1,495,768
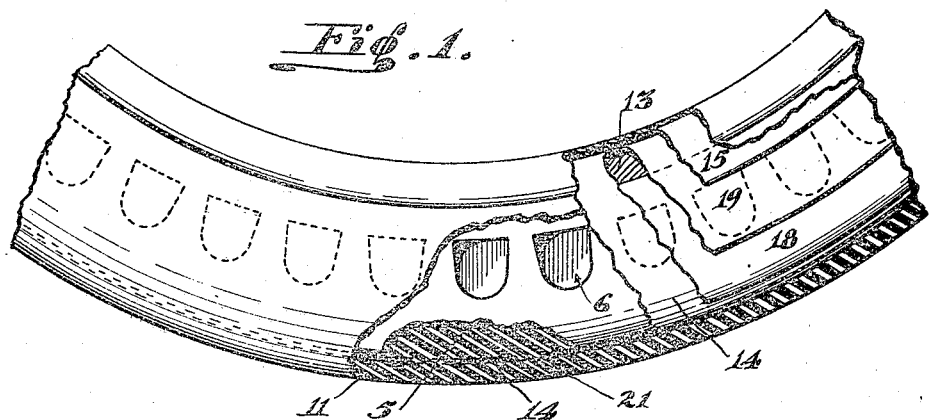
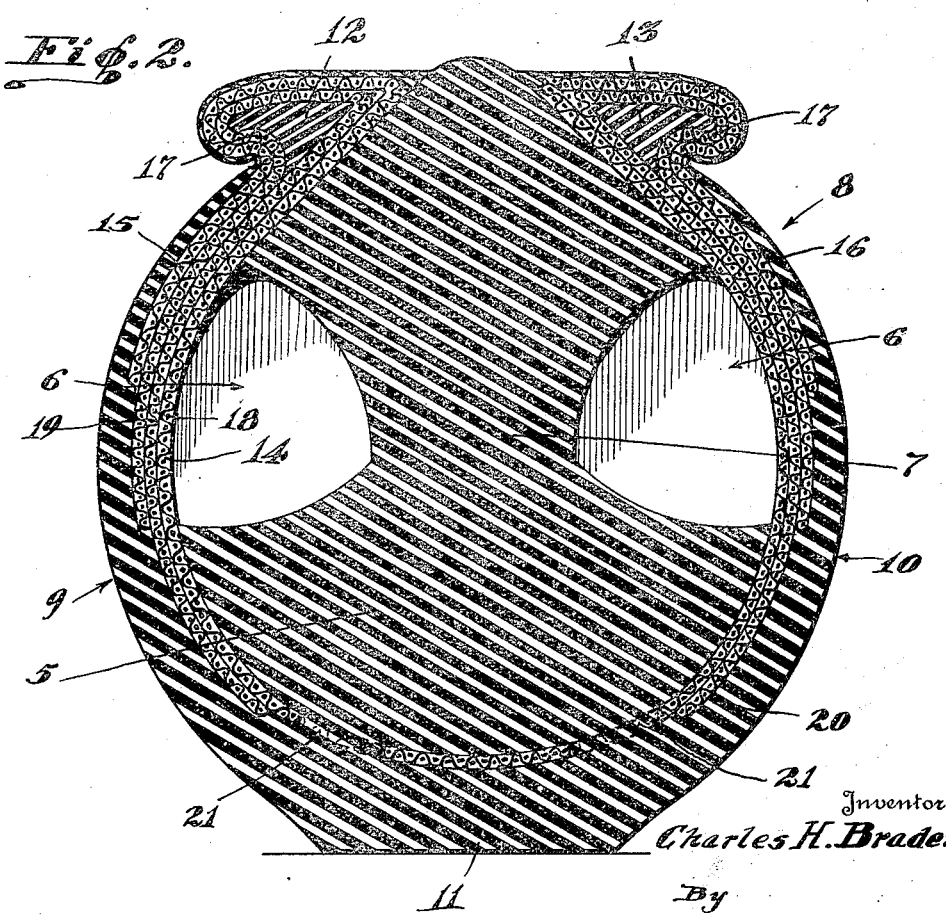
Inventor
Charles H. Braden,
By
R. S. Berry,
Attorney Patented May 27, 1924.

1,495,768

UNITED STATES PATENT OFFICE.

CHARLES H. BRADEN, OF LOS ANGELES, CALIFORNIA, ASSIGNOR TO NATIONAL AIRLESS TIRE COMPANY, OF LOS ANGELES, CALIFORNIA, A CORPORATION OF NEVADA.

TIRE CASING.

Application filed February 14, 1922. Serial No. 536,431.

*To all whom it may concern:*

Be it known that I, CHARLES H. BRADEN, a citizen of the United States, residing at Los Angeles, in the county of Los Angeles and State of California, have invented new and useful Improvements in a Tire Casing, of which the following is a specification.

My present invention particularly pertains to a tire of the cushion type in which a core is arranged within a casing and especially relates to the manner of constructing the casing.

An object of the invention is to provide a casing adapted to be demountably attached to a wheel rim in the manner common to pneumatic tires in which the casing is so formed as to have the sides thereof reinforced and stiffened adjacent the inner periphery of the casing and of gradually increasing flexibility toward the outer periphery of the casing.

Another object is to provide a casing embodying an arrangement of layers of reinforcing fabric in its side walls whereby the casing will be capable of ready flexure along its tread and the flexure of its sides adjacent the wheel rim opposed so as to protect the casing against rim cuts.

Another object is to provide a casing which is especially adapted for use in conjunction with a core formed with side depressions or recesses whereby the portion of the casing extending over the recesses will be strengthened and stiffened so as to be supported against sagging into the recesses or being readily indented where it spans the recesses.

A further object is to provide a tire embodying a cushion core and a fabric reinforced casing encompassing the core in which the core and casing are affixed together to form the tire into one piece to obviate the friction and wear incident to movement of the core and casing relative to each other, and in which means are provided whereby the tread portion of the casing may be vulcanized to the material of the core thru a fabric lining with which the casing is provided to effect a secure anchorage of the core within the casing.

With the foregoing objects in view, together with such other objects and advantages as may subsequently appear, my invention consists in the parts and the construction and arrangement of parts hereinafter more fully described and claimed and illustrated in the accompanying drawings, in which—

Fig. 1 is a view in side elevation of a portion of the tire with parts broken away.

Fig. 2 is a view of the tire as seen in cross section.

In carrying out my invention I employ an annular core 5 formed of rubber or rubber composition to provide a resilient or cushion body. This core is preferably formed with a continuous outer circumferential face, constituting its tread portion and also with a continuous inner circumferential face and with a continuous central body extending between the inner and outer peripheries of the core to afford a substantial support for loads imposed upon the tire.

As a means for permitting ready flexure of the side portions of the core, a row of cavities or recesses 6 is formed on each side of the core, with adjacent cavities separated by a wall 7, the outer face of which is formed in continuation of the side faces of the core. The recesses 6 are preferably arranged so that the major portions thereof will extend adjacent to the inner periphery of the core and thereby provide a wide continuous body thruout the outer periphery of the core on each side of the circumferential center thereof.

The core thus formed is designed to be encompassed by a casing 8 which is constructed somewhat in the form of the casings ordinarily employed in pneumatic tires and comprises a tubular annulus divided on its inner periphery forming side-walls 9 and 10 connected together by a tread-wall 11. The side walls are formed at their inner peripheries with reinforcing rings 12 and 13.

The casing is formed with a fabric lining 14 which extends thruout the interior of the casing and is carried around the rings 12 and 13 and is brought a short distance over the sides of the casing in overlapped relation to the lining portion 14 forming flaps 15 and 16, the edges of which terminate approximately midway between the inner and outer margins of the recesses 6. A fabric strip 17 is folded longitudinally over each of the rings 12 and 13 and carried in overlapped relation over the back of the fabric lining 14 between the lining and the flaps 15 and 16; this sheet forming fabric layers 18 and 19 extending into the sides of the casing. The fabric sheet 18 terminates adjacent the tread portion of the casing and the sheet 19 terminates about midway of the side walls of the casing between the edge of the flap 15 or 16 and the edge of the layer 18. By this construction a series of four layers of fabric are formed adjacent the rings at the inner peripheries of the side portion of the casing and extend along the sides of the casing so as to partly over-lap the recesses 6. The number of layers of fabric decreases toward the tread portion of the casing, there being three layers of fabric provided at the middle of the side walls of the casing and extending over the recesses, and two layers extending between the middle portion of the side walls and the tread portion of the casing. By this arrangement of fabric re-inforcing strips the casing will be formed with greater flexibility at its tread, and its side walls will be stiffened adjacent their inner peripheries and will be afforded increasing flexibility toward the tread portion by the stepped arrangement of the fabric layers. The fabric layers are rubber coated and vulcanized together as is common in tire casing constructions and are covered with a body 20 of rubber or rubber composition.

The core and casing are cemented or vulcanized together thruout their contacting surfaces and as a means for effecting a secure connection between the core and the casing the lining strip 14 which is formed of closely woven fabric, is provided with a series of perforations or gaps 21 so that the core 5 and the composition portion 20 of the casing may be directly vulcanized together thru the openings 21. By this construction the tendency of the fabric lining to pull away from the core under the severe strains to which it is subjected in service, is largely overcome.

While I have shown and described the casing so formed with four layers of fabric at the inner portions of the sides thereof, and as decreasing in number to the tread portion of the casing where a single layer is employed, I do not limit myself to this exact number and arrangement as in some instances the number of layers may be increased, the essential feature of the invention residing in providing a greater thickness of fabric at the inner portions of the casing side-walls with the layers decreasing toward the tread.

I claim:

1. A tire comprising a core, a casing encompassing said core formed with a fabric lining, said casing being divided on its inner periphery and having its side walls formed with a series of layers of fabric arranged in stepped relation with the greatest thickness of fabric arranged adjacent the inner peripheries of the side walls and the layers of fabric decreasing in number toward the tread portion of the tire, the fabric lining being formed with gaps thru which the material of the core and the casing may be vulcanized together.

2. A tire casing comprising a tubular annulus divided on its inner periphery forming side walls, a reinforcing ring at the inner edge of each side wall, a fabric lining sheet covering the interior of the casing and extending around the rings with its edge portions extending along the sides of the casing, and a reinforcing fabric strip folded longitudinally over each ring with its edge portions overlapped and extending between the lining and the overlapping edge portion thereof, the edge portions of said reinforcing strip terminating in spaced relation to each other between the tread portion of the casing and the overlapping edge portion of the lining.

3. A tire having a casing fabric softer at the tread than at the beads, a soft core in the casing fabric, and a rubber cover for the fabric, the core and cover being vulcanized together through openings in the fabric at the tread.

4. In a tire, a casing comprising a tubular annulus divided on its inner periphery forming side walls connected by a tread wall, a fabric lining sheet on the interior of the casing, and a series of layers of fabric in each of the casing side walls, one of which layers extends from the edge of the side wall and terminates adjacent to the tread, and the other layers extending from the edge of the side wall and terminating in stepped relation to each other and to the other fabric strip whereby the side walls of the casing will have gradually increasing flexibility from the edge of the side walls to the tread, and a resilient core within said casing.

CHARLES H. BRADEN.